(12) United States Patent
Ooba et al.

(10) Patent No.: US 8,204,347 B2
(45) Date of Patent: Jun. 19, 2012

(54) OPTICAL SIGNAL PROCESSING DEVICE

(75) Inventors: Naoki Ooba, Atsugi (JP); Kenya Suzuki, Atsugi (JP); Motohaya Ishii, Atsugi (JP); Shinji Mino, Atsugi (JP); Atsushi Aratake, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 362 days.

(21) Appl. No.: 12/671,684

(22) PCT Filed: Aug. 21, 2008

(86) PCT No.: PCT/JP2008/064946
§ 371 (c)(1),
(2), (4) Date: Feb. 1, 2010

(87) PCT Pub. No.: WO2009/025333
PCT Pub. Date: Feb. 26, 2009

(65) Prior Publication Data
US 2011/0228374 A1    Sep. 22, 2011

(30) Foreign Application Priority Data
Aug. 23, 2007 (JP) .................. 2007-217317

(51) Int. Cl.
*G02B 6/34* (2006.01)
*G02B 1/295* (2006.01)
*G02B 26/00* (2006.01)

(52) U.S. Cl. .......... 385/37; 359/238; 359/245; 359/279; 359/298; 385/2; 385/3; 385/8; 385/9; 385/10; 385/31; 385/33; 385/34; 385/50

(58) Field of Classification Search .................. 359/238, 359/245, 279, 298; 385/2, 3, 8–10, 31, 33, 385/34, 37, 50
See application file for complete search history.

(56) References Cited

U.S. PATENT DOCUMENTS
6,122,419 A    9/2000    Kurokawa et al.
(Continued)

FOREIGN PATENT DOCUMENTS
JP    2002-250828    9/2002
(Continued)

OTHER PUBLICATIONS

D.M. Marom et al., *Compact Spectral Pulse Shapping Using Hybrid Planar Lightwave Circuit and Free-Space Optics with MEMS Piston Micromirros and Spectrogram Feedback Control*, LEOS 2004, The 17th Annual Meeting, vol. 2, Nov. 7-11, 2004, WP1, pp. 585-586.

(Continued)

*Primary Examiner* — Evelyn A. Lester
(74) *Attorney, Agent, or Firm* — Workman Nydegger

(57) ABSTRACT

In a conventional optical signal processing device, a confocal optical system is configured in which a focusing lens is positioned at a substantially-intermediate point of a free space optical path. Thus, the free space optical system had a long length. It has been difficult to reduce the size of the entire device. The optical signal processing device of the present invention uses a lens layout configuration different from the confocal optical system to thereby significantly reduce the length of the system. The optical signal processing device consists of the first focusing lens positioned in the close vicinity of a signal processing device, and the second focusing lens positioned in the vicinity of a dispersing element. A distance between the dispersing element and the signal processing device is approximately a focal length of the first focusing lens. Compared with the conventional technique, the length of the optical path can be halved.

18 Claims, 10 Drawing Sheets

U.S. PATENT DOCUMENTS

| | | | |
|---|---|---|---|
| 7,889,991 B2 * | 2/2011 | Ranalli | 385/37 |
| 2004/0151432 A1 | 8/2004 | Tabuchi et al. | |
| 2005/0013541 A1 * | 1/2005 | Kittaka et al. | 385/37 |
| 2005/0213978 A1 * | 9/2005 | Yamashita et al. | 398/79 |
| 2007/0071385 A1 * | 3/2007 | Dorrer et al. | 385/15 |
| 2007/0237451 A1 * | 10/2007 | Colbourne | 385/18 |
| 2008/0031570 A1 | 2/2008 | Fondeur et al. | |

FOREIGN PATENT DOCUMENTS

| | | |
|---|---|---|
| JP | 2004-239991 | 8/2004 |
| JP | 2008-40500 A1 | 2/2008 |
| JP | 2008-224824 A1 | 9/2008 |
| WO | WO 2008/111444 A1 | 9/2008 |

OTHER PUBLICATIONS

D.M. Marom et al., *Hybrid Free-space and Planar Lightwave Circuit Wavelength-Selective 1x3 Switch with Integrated Drop-side Demultiplexer*, ECOC 2005, vol. 4, Sep. 25-29, 2005, Th3.6.4, pp. 993-994.

N. Ooba et al., *Compact Wide-band Wavelength Blocker Utilizing Novel Hybrid AWG-Free Space Focusing Optics*, OFC/NFOEC 2008, Feb. 24-28, 2008, OW12, pp. 1-3.

International Preliminary Report on Patentability and Written Opinion issued in PCT Application No. PCT/JP2008/064946 on Mar. 4, 2010 (English translation).

* cited by examiner

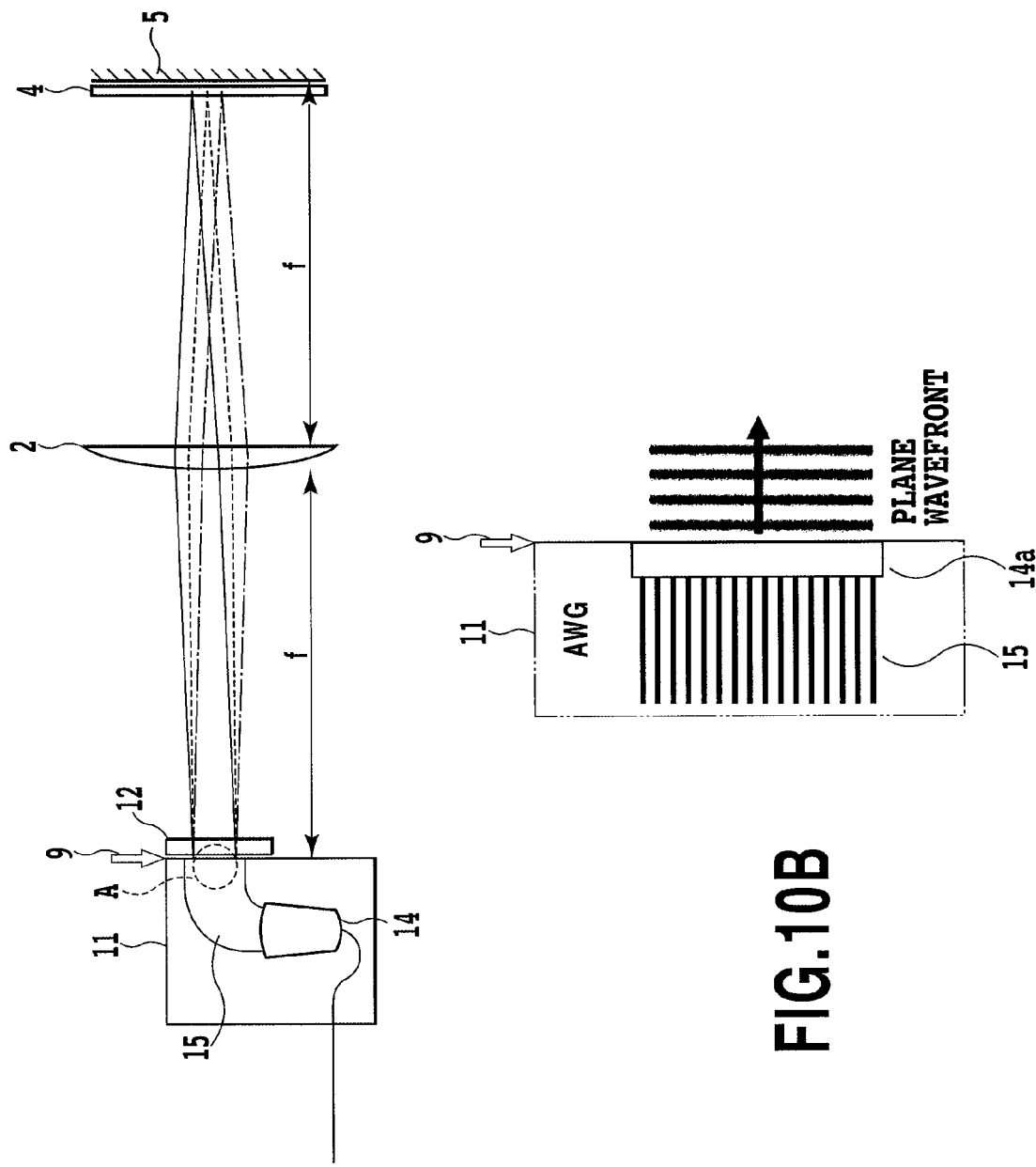

OPTICAL SIGNAL PROCESSING DEVICE

TECHNICAL FIELD

The present invention relate to an optical signal processing device. In particular, the present invention relates to an optical signal processing circuit including a lens.

BACKGROUND ART

With the advance of an optical communication network having a high speed and a high capacity, needs for an optical signal processing device, a typical example of which is the wavelength division multiplexing (WDM) transmission signal processing, also has been increased. For example, a function has been required to switching a path of a multiplexed optical signal among nodes. By directly subjecting an optical signal to a path conversion without using an optical-electrical conversion, more optical signal processing devices having a higher speed have been made.

On the other hand, from a viewpoint of an optical signal processing device having a smaller size and integration, a planar lightwave circuit (PLC) has been researched and developed. In the PLC, a core made of silica glass is formed on a silicon substrate for example to integrate various functions on one chip to thereby realize an optical function device having a small loss and high reliability. Furthermore, a composite optical signal processing component (device) obtained by combining a plurality of PLC chips with other optical functional components also has been found.

For example, Patent Publication 1 discloses a signal processing device obtained by combining a PLC including arrayed-waveguide grating (AWG) for example with a spatial modulation device such as a liquid crystal device. More specifically, a wavelength blocker, a wavelength equalizer, a dispersion compensator or the like has been examined including a PLC with a collimate lens symmetrically arranged around a liquid crystal device at the center. In these optical signal processing devices, a plurality of optical signals having different wavelengths are subjected to an optical signal processing in an independent manner for each wavelength.

FIG. 9 is a conceptual diagram illustrating the configuration of an optical signal processing device. In this optical signal processing device, an optical signal is inputted and outputted through a spectroscopic element 100. The spectroscopic element 100 subjects a plurality of optical signals having different wavelengths to disperse at an angle depending on the wavelength thereof. The dispersed optical signal is output toward a focusing lens 2. The optical signal focused by the focusing lens 2 is focused, depending on the angle θ, to the respective focal points at predetermined positions of a signal processing device 4 having functions of intensity modulation, phase modulation, or steering. Specifically, it is noted that depending on the wavelength of the input optical signal, the optical signal is focused at different positions of the signal processing device. The signal processing device 4 is, for example, a liquid crystal device consisting of a plurality of element devices (pixels). By the control of the transmittance of the respective element devices or the like, the optical signals of the respective wavelengths are subjected to intensity modulation or the like to thereby realize a predetermined signal processing function. The optical signal subjected to the signal processing is reflected by a mirror 5 to have an inverted travelling direction. The optical signal further passes through a focusing lens 3 and is wavelength-multiplexed in the spectroscopic element 100. As is generally known, the spectroscopic element 100 also can subject the optical signal to the wavelength-multiplexing depending on the travelling direction. The wavelength-multiplexed optical signals having the respective wavelengths are outputted to the outside of the optical signal processing device as output light.

In FIG. 9, the spectroscopic element 100 is conceptually shown and may be the one that can perform wavelength-demultiplexing and wavelength-multiplexing depending on the wavelength of the optical signal. For example, the spectroscopic element includes grating, prism, AWG or the like. The signal processing device may be the one that can modulate the intensity or the phase of the optical signal or the intensity and the phase or that can steer the traveling direction of the optical signal. For example, the signal processing device includes, for example, a liquid crystal device, Micro-Electro Mechanical Systems (MEMS) mirror, and nonlinear optical crystals.

The optical signal processing device shown in FIG. 9 is configured so that a mirror is used to reflect the optical signal so that one spectroscopic element performs both of the wavelength-demultiplexing and wavelength-multiplexing of the optical signal. This configuration is generally called the reflective-type one. The device for performing an optical signal processing such as wavelength block is not limited to this configuration. For example, another configuration is also possible where the mirror of FIG. 9 is not used and the signal processing device is positioned at a position of a symmetrical axis and the opposite side of the input system on the extended line of an input light path axis has an output system consisting of another lens and a spectroscopic element. This configuration is a configuration in which optical signal is dispersed and wavelength-multiplexing via the independent input system and output system, respectively and is called as the transmission-type one. Furthermore, by changing the angle of the mirror in the device configuration of FIG. 9, another configuration is also possible where an output system consisting of another lens and a spectroscopic element positioned at an arbitrary position is used to subject an optical signal to wavelength-multiplexing. For example, a configuration is also possible where the reflecting surface of the mirror is inclined by 45 degrees to an incident light path of the optical signal to provide a lens and a spectroscopic element placed in the vertical direction to the incident light path to thereby configure the output system. When the signal processing device has a steering function, the configuration also can include a plurality of output systems.

In FIG. 9, the spectroscopic element 100 is separated from the focusing lens 2 by a front focal length (FFL). The signal processing device 4 is separated from the focusing lens 2 by a back focal length (BFL). The position of the focal point of the light focused by the focusing lens 2 must be on the surface of the mirror 5 in all wavelengths used. If the position of the focal point of the light is dislocated from the mirror surface, a coupling loss between input and output lights is caused. Furthermore, a focused optical signal has an increased beam spot diameter. This consequently causes a disadvantage where the signal processing in the optical signal processing device has a declined wavelength resolution.

Furthermore, the signal processing device 4 must include a spatially-periodic structure in order to selectively perform modulation depending on each wavelength of an optical signal. For example, when the signal processing device 4 is a liquid crystal device, the structure of the element device of the liquid crystal device must be designed depending on the optical characteristics of the spectroscopic element and the focusing lens.

More specifically, it is known that the wavelength dependency of the focusing position on the signal processing device is determined by multiplying the angular dispersion value of the spectroscopic element with the focal length of the focusing lens. The wavelength dependency of the focusing position is also called a linear dispersion value of an optical system of a spectrometer. The linear dispersion value of the optical system determined by the spectroscopic element and the focusing lens must be close sufficiently to a linear dispersion value used for the design of the structure of the signal processing device. If these linear dispersion values are different from each other, the position of a focal point of an actual optical signal does not correspond to the position of each element device of the signal processing device (e.g., pixel of a liquid crystal shutter device). This inconsistency causes a wavelength error in a processed optical signal.

Patent Publication 1: Japanese Laid-Open Patent Application Publication No. 2002-250828 (page 16, page 19, FIG. 20, FIG. 27, FIG. 29D or the like)

DISCLOSURE OF THE INVENTION

However, the conventional optical signal processing device had a disadvantage in that a long optical path of a free space optical system prevents the entire device from having a smaller size. Specifically, a space in the device in which element components of the optical system are placed required a length at least twice of the effective focal length of a lens used.

FIG. 10A illustrates a more specific configuration of the conventional optical signal processing device and shows the configuration of a reflective-type optical signal processing device using an AWG 11 as a spectroscopic element. The AWG 11 includes a slab waveguide 14 and an arrayed-waveguide 15 as is well known and is generally formed on a single substrate. From an end face 9 of the AWG 11, an optical signal is inputted and outputted with an angle depending on the wavelength of the optical signal. In the vicinity of the end face 9, a cylindrical lens 12 for collimating the output light in the vertical direction to the substrate of the AWG 11 is placed. The free space optical system of the optical signal processing device includes, as in the configuration of the conceptual diagram shown in FIG. 9, the focusing lens 2, the signal processing device 4, and the mirror 5. FIG. 10B illustrates the wavefront of an optical signal emerged from the end face 9. As shown in FIG. 10B, the plane wave is output.

In the optical signal processing device including the above-described spatial modulation device, from the viewpoint of the position at which the lens is placed, an optical characteristic as shown below is required. In general, the aperture stop of an imaging lens is positioned at the center of the lens or in a combination of lenses. On the other hand, in this optical signal processing device, the output beam width is determined depending on the structure of the spectroscopic element. Thus, since the aperture stop is assumed to exist at an output end face of the spectroscopic element, the lens configuration must be optimized in a different way from that in the case of a general imaging lens.

Since this optical signal processing device has a configuration of an optical coupling system, the light beam must enter normally to the signal processing device and the mirror. Among imaging lenses, an image-space telecentric lens satisfies this demand. Based on this condition, the focusing lens must be positioned so that the output end face of the spectroscopic element is not only at an aperture stop but also at a front focal point of the focusing lens.

As is clear from FIG. 10A, the optical signal processing device requires a length from the AWG 11 to the signal processing device 4 that is about twice as that of the effective focal length f of the focusing lens 2. If the transmission-type configuration has another free space optical system placed on the extended line at the opposite side of the focusing lens, a distance four times longer than the effective focal length f is required. The configuration as described above is called a confocal optical system, which has been a cause of hindering optical signal processing devices from having a smaller size.

Furthermore, in the optical signal processing devices as shown in FIG. 9 and FIG. 10A, an optical signal is focused on a surface of the signal processing device at a different position depending on each wavelength of the optical signal. As described earlier, the linear dispersion value of the optical system determined by the spectroscopic element and focusing lens must be close sufficiently to the linear dispersion value used in the structure of the signal processing device. In the case of the optical signal processing device as shown in FIG. 9 configured by an optical system consisting of one focusing lens, when a signal processing is performed based on a resolution of 5 GHz in one optical fiber communication bandwidth (5000 GHz) for example, the linear dispersion value of the optical system must have an error accuracy of 0.1% or less. However, a general manufacturing method has an error in the focal length of the focusing lens of about 1%. This has required, in order to obtain a high accuracy of 0.1% or less in the linear dispersion values of the optical system, a step of manufacturing optical signal processing device requiring a special adjustment process of the optical system. This has caused a disadvantage of an increased manufacture cost of the optical signal processing device.

As described above, in the conventional optical signal processing device, a confocal optical system is configured in which the focusing lens is positioned at the substantial intermediate point of the free space optical path. This has caused a disadvantage of a long distance of the space optical system. Furthermore, a disadvantage also has bee caused where a high accuracy is required in the adjustment process during the manufacture of the optical signal processing device. Furthermore, a disadvantage also has bee caused where the device and manufacture method require a high cost. The present invention solves the above-described disadvantages, shortens the free space optical system of the optical signal processing device, and simplifies the adjustment of the optical signal processing device.

One embodiment of the present invention is: an optical signal processing device, characterized in comprising: a dispersing means for spatially dispersing and outputting an optical signal from a dispersion center in a dispersion plane with an angle depending on a wavelength of the optical signal; a first focusing lens for focusing the optical signal dispersed by the dispersing means; a second focusing lens that is positioned in the vicinity of the dispersing means and between the first focusing lens and the dispersing means; and a signal processing means that is positioned at an opposite side of the dispersing means with respect to the first focusing lens, that is positioned at a position closer than a back focal point of the first focusing lens, and that subjects the optical signal focused by the first focusing lens and the second focusing lens to intensity modulation, phase modulation, or steering, wherein the dispersion center of the dispersing means is positioned in a front focal point position of a two-lens system comprising the first focusing lens and the second focusing lens or the vicinity thereof.

An optical signal processing device of another embodiment of the present invention is: an optical signal processing device, comprising: a dispersing means for spatially dispersing and outputting an optical signal from a dispersion center in a dispersion plane with an angle depending on a wavelength of the optical signal; a first focusing lens for focusing the optical signal dispersed by the dispersing means; a second focusing lens that is positioned in the vicinity of the dispersing means and between the first focusing lens and the dispersing means; and a signal processing means that is positioned at an opposite side of the dispersing means with respect to the first focusing lens, that is positioned at a position closer than a back focal point of the first focusing lens, and that subjects the optical signal focused by the first focusing lens and the second focusing lens to intensity modulation, phase modulation, or steering, wherein: a principal plane of the second focusing lens at the first focusing lens-side also can be positioned in a front focal point position of the first focusing lens or the vicinity thereof.

According to an optical signal processing device of a still another embodiment of the present invention, the optical signal processing device includes: a dispersing means for dispersing and outputting an optical signal from a dispersion center in a dispersion plane with an angle depending on a wavelength of the optical signal; a first focusing lens for focusing the optical signal dispersed by the dispersing means; a second focusing lens that is positioned in the vicinity of the dispersing means and between the first focusing lens and the dispersing means; and a signal processing means that is positioned at an opposite side of the dispersing means with respect to the first focusing lens, that is positioned at a position closer than a back focal point of the first focusing lens, and that subjects the optical signal focused by the first focusing lens and the second focusing lens to intensity modulation, phase modulation, or steering, wherein: the dispersion center of the dispersing means is positioned in a principal plane of the second focusing lens at the dispersing means-side and a principal plane of the second focusing lens at the first focusing lens-side also can be positioned in a front focal point position of the first focusing lens or the vicinity thereof.

According to an optical signal processing device of a still another embodiment of the present invention, the optical signal processing device includes: a dispersing means for dispersing an optical signal from a dispersion center in a dispersion plane with an angle depending on a wavelength of the optical signal, the dispersing means has a focusing power, and an optical signal with a cylindrical wavefront in the dispersion plane is output from an optical signal output plane of the dispersing means, a focusing lens for focusing the optical signal dispersed by the dispersing means; and a signal processing means that is positioned at an opposite side of the dispersing means with respect to the focusing lens, that is positioned at a position closer than a back focal point of the first focusing lens, and that subjects the optical signal focused by the focusing lens to intensity modulation, phase modulation, or steering, wherein: the dispersion center of the dispersing means can be positioned in a front focal point position of the focusing lens or the vicinity thereof. Preferably, the focusing lens is a convex plano-convex lens or a meniscus lens at the dispersing means-side.

More preferably, the optical signal processing device further includes: a cylindrical lens that is positioned in the vicinity of the dispersing means and that has a focusing power in a direction vertical to the dispersion plane; and a second cylindrical lens that is positioned at a substantially intermediate point between the dispersing means and the signal processing device and that has a focusing power in a direction vertical to the dispersion plane, wherein: the focusing lens can be a cylindrical lens having a focusing power only in a direction including the dispersion plane.

Furthermore, preferably, the dispersing means in the above-described optical signal processing device can be an arrayed-waveguide grating.

Furthermore, an optical signal processing device of another embodiment of the present invention is an arrayed-waveguide grating (AWG) comprising at least one input waveguide, a first slab waveguide, an arrayed-waveguide, and a second slab waveguide, the AWG spatially disperse an optical signal with an angle depending on a wavelength of the optical signal and the arrayed-waveguide has a focusing power and an optical signal having a cylindrical wavefront is emerged from an output facet of the AWG in a dispersion plane, comprising: a first cylindrical lens for focusing the optical signal dispersed by the AWG; a second cylindrical lens that is positioned in the vicinity of the output facet of the AWG and that has a focusing power in a direction vertical to the dispersion plane; and a signal processing means that is positioned at an opposite side of the AWG with respect to the first focusing lens, that is positioned at a position closer than a back focal point of the first focusing lens, and that subjects the optical signal focused by the first focusing lens to intensity modulation, phase modulation, or steering, wherein: a front focal point position of the first cylindrical lens almost optically corresponds or optically corresponds to the output facet position of the arrayed-waveguide.

Preferably, the optical signal processing device can further include a mirror that reflects the optical signal processed by the signal processing means to bend an optical path of the optical signal.

More preferably, one or more output optical systems consisting of focusing lenses and dispersing elements can be positioned at a position that is opposite side of an input optical system with respect to an axis of symmetry or at a position that is on an optical path extending from an axis of rotation, the axis of symmetry or the axis of rotation is located at the position of the signal processing means.

As described above, according to the present invention, the length of the free space optical system of the optical signal processing device can be reduced to about a half of the conventional one. Furthermore, the optical signal processing device can be adjusted easily.

BRIEF DESCRIPTION OF THE DRAWINGS

FIG. 10A illustrates a specific configuration of a conventional optical signal processing device; and FIG. 10B illustrates a wavefront at an AWG output facet of a conventional optical signal processing device.

BEST MODE FOR CARRYING OUT THE INVENTION

Hereinafter, with reference to the drawings, embodiments of the present invention will be described in detail. The optical signal processing device of the present invention modifies a lens layout configuration of a free space optical system to thereby significantly reduce the length of the free space optical system.

Figure 1A:
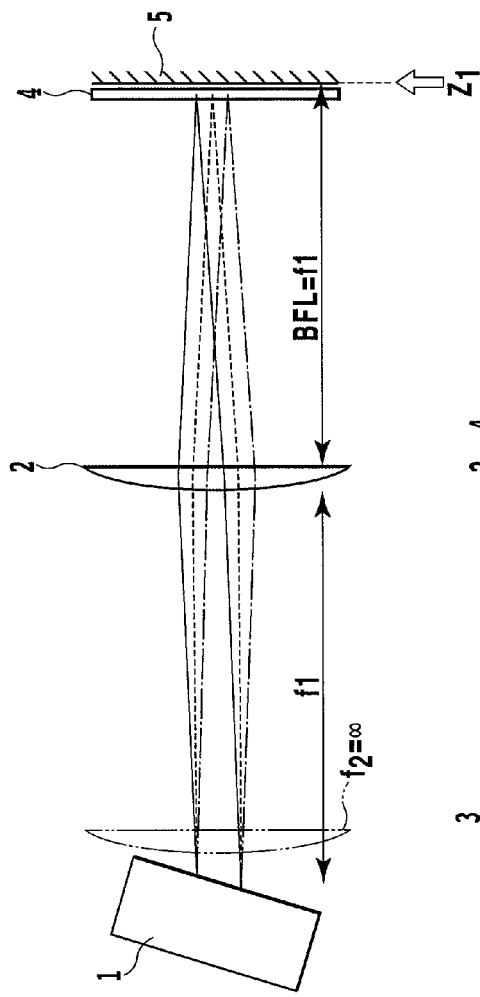
FIG. 1A illustrates a configuration of an optical system of an optical signal processing device according to a conventional technique.
Figure 1B:
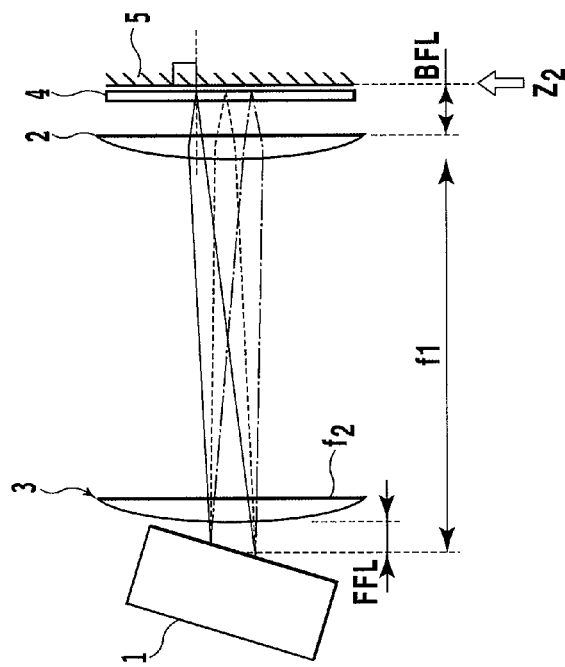
FIG. 1B illustrates a configuration of an optical system of an optical signal processing device according to the present invention.
Figure 9:
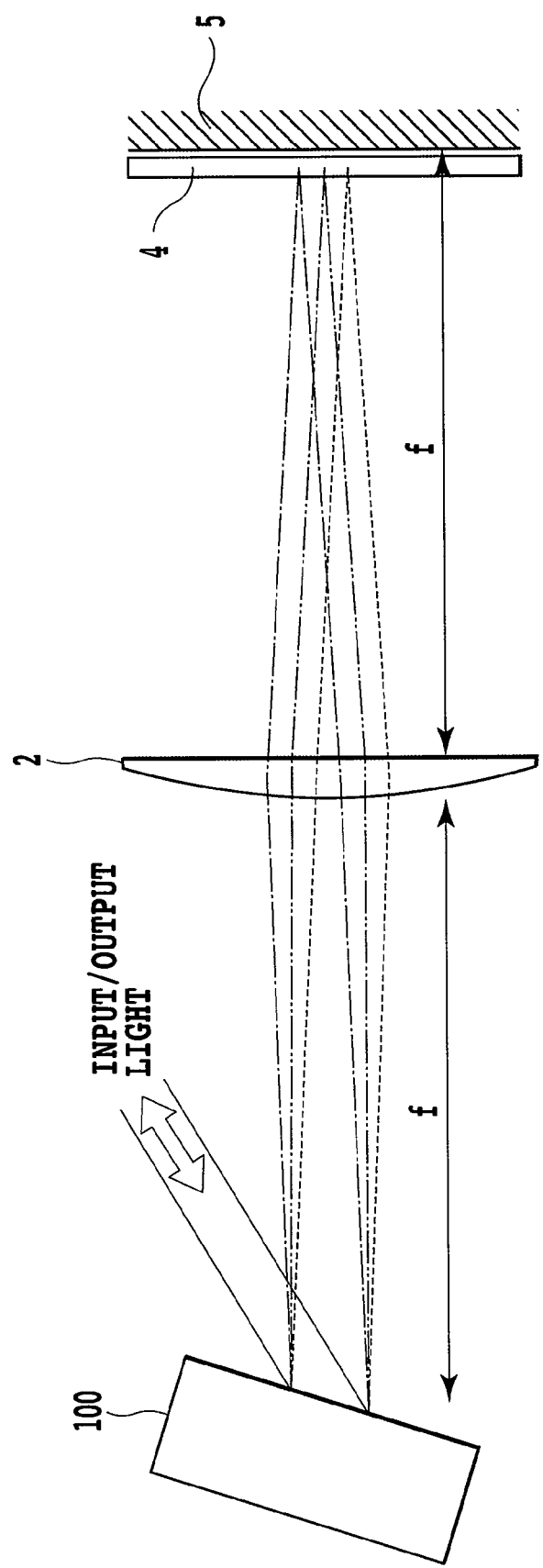
FIG. 9 illustrates a conceptual configuration of a conventional optical signal processing device.

FIG. 1A and FIG. 1B are a conceptual diagram illustrating the configuration of an optical system of the optical signal processing device of the present invention and a configuration according to a conventional technique for comparison. FIG. 1A also shows the configuration of the optical system of conventional optical signal processing device that has the same configuration as that shown in FIG. 9. Specifically, the focusing lens 2 is placed at substantially the center position in the entire optical path and the signal processing device 4 and the mirror 5 are placed so that the position z1 apart from the focusing lens 2 by the effective focal length f1 of the focusing lens 2 corresponds to the reflecting surface of the mirror 5. Generally, the effective focal length f1 substantially corresponds to the back focal length BFL of the focusing lens 2. A spectroscopic element 1 is placed so that its output point is positioned at the opposite side of the signal processing device 4 apart from the focusing lens 2 by the effective focal length f1. The inventors had researched a method to provide the position of z1 as close as possible to the focusing lens 2.

Here, it is assumed that the second focusing lens virtually exists in the vicinity of the spectroscopic element 1 of FIG. 1A. In this case, if the second focusing lens has an infinite focal length, this is equivalent to that the second focusing lens does not exist. In order to move the position z1 of the reflecting surface of the mirror 5 to the focusing lens 2-side to reduce the back focal length BFL, the focal length f2 of the second focusing lens 3 may be changed from an infinite value to a small finite value to select an appropriate value.

The signal processing device 4 includes, for example, a liquid crystal device, an MEMS mirror, or a nonlinear optical crystals or the like. Needless to say, the present invention is characterized in its method for configuring a free space optical system and thus the optical signal processing device shown in FIG. 1A has a reflective-type configuration but the invention also can be applied to the so-called transmission-type configuration. In the transmission-type configuration, two spectroscopic elements also can be used to provide optical systems of an input system and an output system on one straight line. Alternatively, the optical systems of the input system and the output system also can be placed on different lines. It is noted that the signal processing device in this specification also includes a steering device. It is noted that the use of the steering device can provide a configuration including a plurality of output systems and thus the present invention includes a case where three or more spectroscopic elements exist in the entire device.

FIG. 1B illustrates the configuration of an optical system of the optical signal processing device of the present invention. When this configuration is compared with the configuration of FIG. 1A, the optical signal processing device of the present invention is characterized in including: the first focusing lens 2 placed in the vicinity of the signal processing device 4; and the second focusing lens 3 placed in the vicinity of the spectroscopic element 1. When assuming that the first focusing lens 2 has a focal length f1 and the second focusing lens 3 has a focal length f2, the distance BFL between the reflecting surface of the mirror 5 and the first focusing lens 2 is approximately represented by the following formula when the spectroscopic element 1 is sufficiently close to the second focusing lens 3.

$$BFL = \frac{f1 \times (f2 - f1)}{f2} \qquad \text{Formula (1)}$$

The focal length of the first focusing lens may be determined so that the linear dispersion value of a desired optical system can be realized while considering the angle dispersion value of the spectroscopic element and the structure design of the signal processing device. When assuming that f1=f2, BFL is 0. In order to minimize the length of the optical path of the entire optical signal processing device, BFL may approximate to 0 as close as possible. However, an appropriate value may be determined in consideration of the correspondence to the thickness of the signal processing device 4 and the easiness and minute adjustment of the manufacture of the entire optical signal processing device. When BFL is determined, then the formula (1) is used to determine the focal length f2 of the second focusing lens 3. Furthermore, in order to reduce the entire length of the optical path, two lenses of the first focusing lens 2 and the second focusing lens 3 desirably have a short front focal length (FFL). In order to realize this, the position of the principal plane (the second principal plane) of the second focusing lens 3 at the first focusing lens 2-side must be close to the front focal point of the first focusing lens 2. In an ideal case, when the position of the second principal plane of the second focusing lens 3 corresponds to the front focal point of the first focusing lens 2, the two lenses automatically can have a front focal point position at a position of the first principal plane of the second focusing lens 3, thus minimizing the entire length of the optical path. If a meniscus lens of which convex-side faces the spectroscopic element is used as the second focusing lens 3, the principal plane can be positioned at the outside of the lens at the spectroscopic element-side, thus realizing the above ideal conditions.

As described above, by the configuration composed of the first focusing lens 2 placed in the vicinity of the signal processing device 4 and the second focusing lens 3 placed in the vicinity of the spectroscopic element 1, the optical signal processing device can have an effective focal length that is almost equal to the focal length f1 of the first focusing lens 2. When compared with the face that the optical signal processing device of the conventional technique requires a distance twice as long as the effective focal length f of the focusing lens, it is understood that the configuration of the optical signal processing device of the present invention can halve the entire length of the space optical system.

Figure 2:
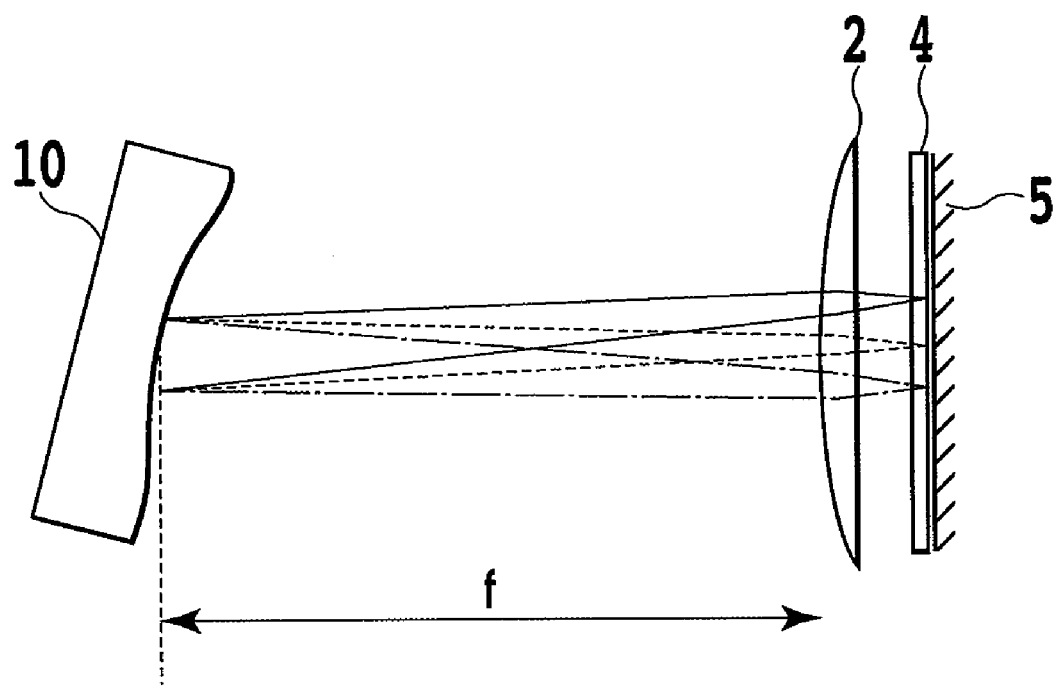
FIG. 2 is a conceptual diagram illustrating another embodiment of the optical signal processing device of the present invention.

FIG. 2 is a conceptual diagram illustrating another embodiment of the optical signal processing device of the present invention. This embodiment has a different configuration from that of FIG. 1B in that the second focusing lens 3 and the spectroscopic element 1 in the optical signal processing device shown in FIG. 1B are substituted with one spectroscopic element 10 having a focusing power. Although a spectroscopic element having the focusing power as described above is not limited, a concave grating for example can be used. According to the configuration of this embodiment, the spectroscopic element in FIG. 1B can be caused to automatically correspond to the position of the second focusing lens, thus satisfying the ideal conditions for reducing the entire length of the optical system. Furthermore, the number of configuration components also can be reduced. Thus, as in the configuration shown in FIG. 1B, under the conditions having the same effective focal length, an optical signal processing device can be realized in which the entire length of the optical system is reduced to a half of that of the device according to the conventional technique. Hereinafter, the present invention will be described together with more specific illustrative embodiments.

Illustrative Embodiment 1

Figure 3A:
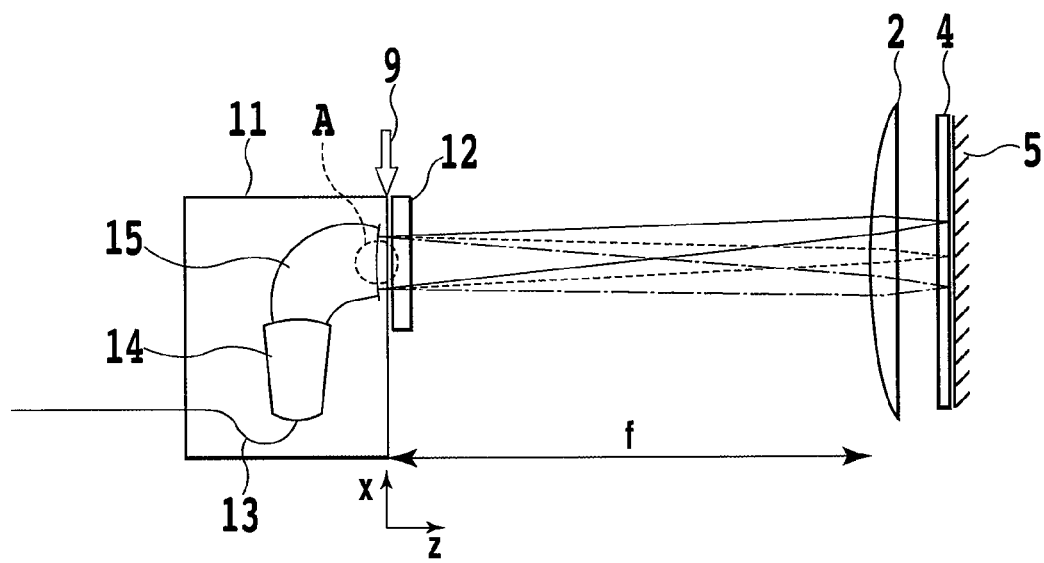
FIG. 3A illustrates a configuration of Illustrative Embodiment 1 of the optical signal processing device of the present invention realized by AWG.

FIG. 3A illustrates a configuration of more specific Illustrative Embodiment 1 of the optical signal processing device of the present invention realized by AWG. In illustrative Embodiment 1, the spectroscopic element 10 having the focusing power in FIG. 2 is configured by the AWG 11 having a focusing power. The AWG is characterized in having a smaller size when compared to other spectroscopic elements such as a grating and a prism. Thus, by applying the AWG to the shortened optical system of the present invention, the entire optical signal processing device can have a smaller size. Furthermore, since the AWG can include a focusing power by merely changing the waveguide pattern, an additional manufacture process required in the case of other spectroscopic elements is not required.

As shown in FIG. 3A, the AWG 11 having a focusing power includes the arrayed-waveguide 15 having a focusing power, an input waveguide 13, and the slab waveguide 14. From the output facet 9 of the AWG 11, within the dispersion plane of the AWG 11 (the x-z plane including AWG substrate) and with the angle depending on the wavelength, light having a cylindrical wavefront within the dispersion plane is output in the z axis direction into a free space. The cylindrical lens 12 having a focusing power in a direction vertical to the substrate of the AWG 11 is placed in the vicinity of the output facet 9. The emerging light from the output facet 9 is transmitted through the cylindrical lens 12 and is refracted to have a spherical wave. The output light transmitted through the cylindrical lens 12 is focused by the focusing lens 2 and is subsequently to a signal processing (e.g., intensity phase modulation device modulation) in the signal processing device 4 and is subsequently reflected by the mirror 5. The operation as a reflective-type optical signal processing device is the same as that in the conventional technique and thus will not be further described in detail. Although the focusing lens 2 has the focal length f, the focusing lens 2 and the mirror 5 are positioned close to each other to have therebetween a distance much shorter than the focal length f. The output facet 9 and the focusing lens 2 are positioned to have therebetween an interval almost equal to the focal length f.

Figure 3B:
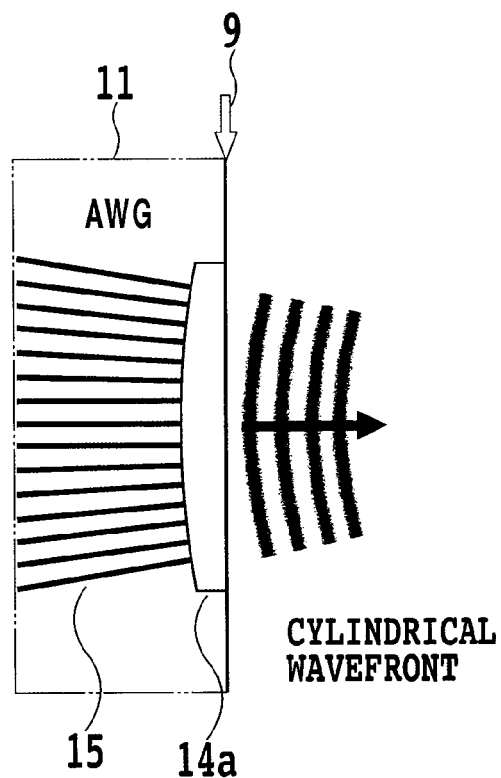
FIG. 3B illustrates a cylindrical wavefront output from the AWG having a focusing power in Illustrative Embodiment 1.

FIG. 3B illustrates a cylindrical wavefront output from the AWG 11 having the focusing power in Illustrative Embodiment 1. FIG. 3B is an expanded view of the part A in FIG. 3A. In the AWG 11 close to the output facet 9, the short slab waveguide 14a connected to the arrayed-waveguide 15 is provided. The arrayed-waveguide 15 having a focusing power is configured so that an equiphase plane of a terminal end of the arrayed-waveguide is provided in a circular arc manner. By this configuration, light can be output from the output facet 9 having a cylindrical wavefront within the dispersion plane. Alternatively, if the length of each waveguide in the arrayed-waveguide is adjusted so that a phase difference at each waveguide terminal end corresponding to a cylindrical wavefront in the output facet 9 is given, the arrayed-waveguide terminal end can be on a straight line. It is noted that the slab waveguide 14a at the output-side is not always required.

Comparison with the conventional technique should be made with regard to a point that a plane wave is output from the output facet 9 as shown in FIG. 10B. By the focusing power owned by the AWG 11 and the focusing power owned by the focusing lens 2, an optical signal propagation path equivalent to that by the shortened space optical system of the present invention shown in FIG. 1B can be configured. The total track of the optical signal processing device is halved when compared with that of the conventional technique. By allowing the AWG to have a focusing power, an accurate cylindrical wavefront can be formed. Specifically, this corresponds to the use of a lens having less distortion than in a case where the second focusing lens is used.

Illustrative Embodiment 2

Figure 4A:
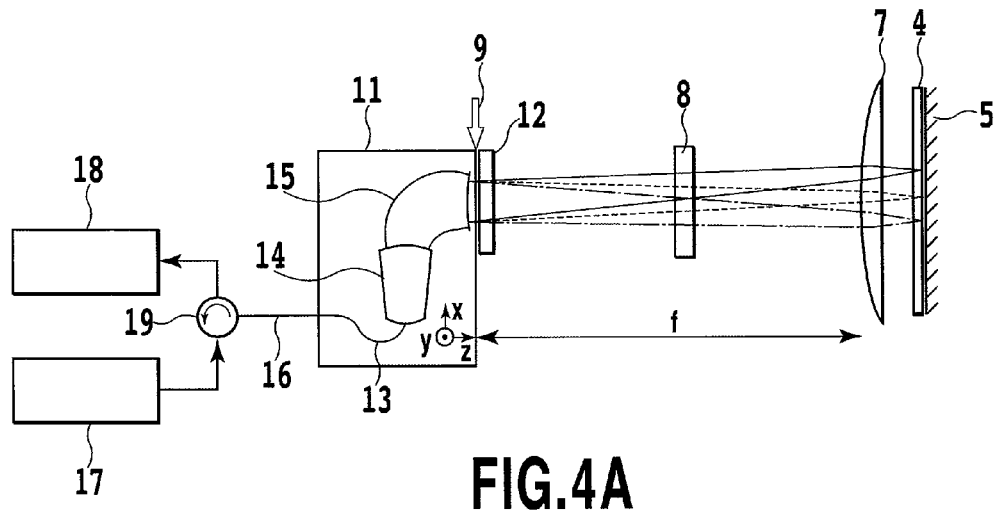
FIG. 4A illustrates a configuration of Illustrative Embodiment 2 of the optical signal processing device of the present invention using the AWG.

FIG. 4A illustrates a configuration of Illustrative Embodiment 2 of the optical signal processing device of the present invention using the AWG. In Illustrative Embodiment 1 shown in FIG. 3A, the AWG 11 had a focusing power only in the x axis direction and no lens power was provided in a direction vertical to the AWG substrate. Thus, the focusing lens 2 can be provided as a cylindrical lens having a focusing power only in the x axis direction and other focusing lenses having a focusing power in a direction vertical to the substrate can be additionally provided.

As shown in FIG. 4A, Illustrative Embodiment 2 is characterized in that the focusing lens 2 is substituted with an x-cylindrical lens 7 having a focusing power in the x axis direction and a y-cylindrical lens 8 having a focusing power in the y axis direction is additionally provided at the center of the optical path. A difference from the optical signal processing device of the configuration shown in FIG. 3A will be described. In the vicinity of the signal processing device 4, the x-cylindrical lens 7 having the focal length f is placed that has a focusing power within the x-z plane. The x-cylindrical lens 7 is placed at a position separated from the output facet 9 of the AWG 11 having a focusing property approximately by the focal length f. An optical signal input/output point of the AWG 11 is connected to a connection optical fiber 16 and is connected via an optical circulator 19 to a broadband light source 17 and an optical spectrum analyzer 18 for measurement.

Figure 4B:
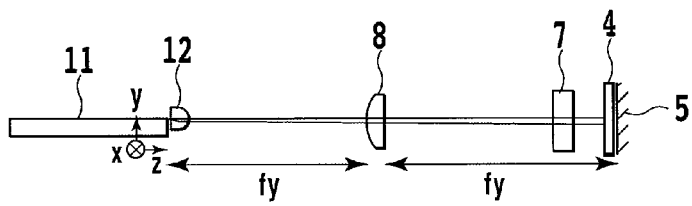
FIG. 4B is a side view illustrating the optical signal processing device of Illustrative Embodiment 2 seen in a y-z plane.

FIG. 4B illustrates the optical signal processing device seen from a side face of the substrate of the AWG 11 and illustrates the focusing state in the y axis direction. In the optical signal processing device of the present invention, the signal processing device 4 selectively performs a signal processing in the x axis direction in accordance with the wavelength of the optical signal. Thus, the signal processing device 4 may have thereon arranged element devices such as liquid crystal element devices. The position of the focal point in the x axis direction has a significant meaning. Thus, a sufficiently-small spot must be focused in the x axis direction. However, in consideration of the shape of the element device for example, the focusing spot may be accommodated in the y axis direction within the range in the longitudinal direction of the element device. Thus, within the y-z plane, the cylindrical lens 12 may be caused to function as a collimate lens and the y-cylindrical lens 8 having the focal length fy as a half of the focal length f of the x-cylindrical lens 7 may be placed at the center of the optical path, thereby configuring the confocal optical system. By providing, as in this configuration, the cylindrical lens 12 and the y-cylindrical lens 8 for the focusing in the y direction, the position of each lens can be easily adjusted to thereby simplify the steps of manufacturing the optical signal processing device.

When only the cylindrical lens 12 is provided, with regard to the y axis direction, the power only by the cylindrical lens 12 must be used to focus the optical signal on the mirror 5 or to turn the optical signal into a parallel light status. However, since the beam in the y axis direction of the output facet 9 of the AWG has a small diameter, the cylindrical lens 12 must have a short focal length. This consequently requires a high accuracy to adjust the position of the cylindrical lens 12, which is disadvantageous in the manufacture. Furthermore, if the cylindrical lens 12 is not provided, when the optical signal reaches the y-cylindrical lens 8, the optical signal significantly expands in the y axis direction, thus causing the y-cylindrical lens 8 to require a lens having a large diameter. Thus, by using two lenses to configure a confocal optical system in the y axis direction as shown in FIG. 4A and FIG. 4B, the above-described adjustment accuracy for the manufacture can be reduced and an easy manufacture can be secured and the lens having a smaller diameter can be realized.

Figure 4C:
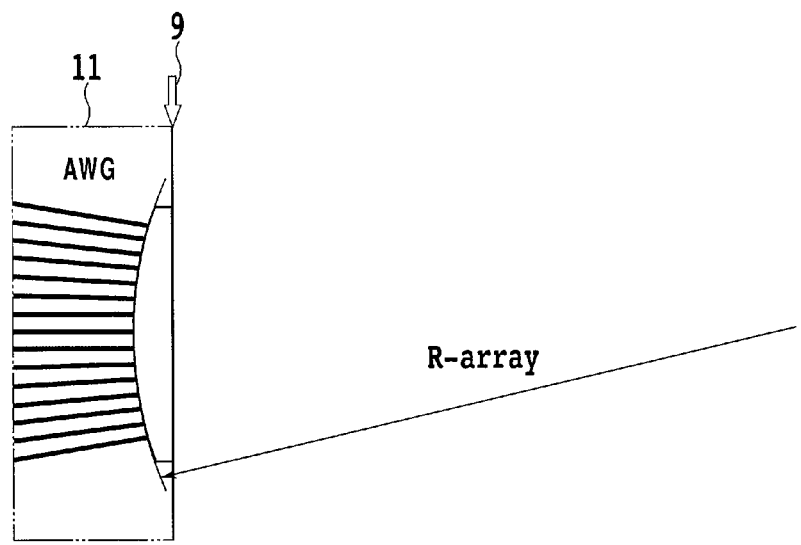
FIG. 4C illustrates a focal length of an AWG lens by the focusing power by the AWG in Illustrative Embodiment 2.

The following section will describe a specific configuration example in which the optical signal processing device has an effective focal length of 100 mm. The x-cylindrical lens is the plano-convex one and has the focal length of 100 mm. The cylindrical lens 12 has a focal length of 0.9 mm. The y-cylindrical lens 8 has the focal length fy of 50 mm. The AWG array has an outlet having a radius of 151.4 mm. The AWG lens has a focal length of 104.6 mm. A distance between the x-cylindrical lens and the mirror is 4 mm. In this case, the distance between the x-cylindrical lens and the AWG is adjusted so that the front focal point position of the x-cylindrical lens corresponds to the center of the array outlet of the AWG end face. The focal length of the AWG lens by the focusing power by the AWG is, as shown in FIG. 4C, R-array/ns when assuming that the slab waveguide has a refractive index ns. In order to evaluate the performance of the focusing lens system, the optical insertion loss was measured without operating the signal processing device 4 so that light was transmitted without modulation.

When the above-described configuration was subjected to the measurement by a broadband light source and an optical spectrum analyzer, the excessive losses were 0.5 dB or less and 1.0 dB or less at the center wavelength and the entire wavelength band of the communication C band, respectively. These losses are at the same level as that of an optical signal processing according to the conventional configuration. According to Illustrative Embodiment 2, the length of the free space optical system of the optical signal processing device can be reduced to a half of that acceding to the conventional technique. The device adjustment is also simplified.

Illustrative Embodiment 3

Figure 5:
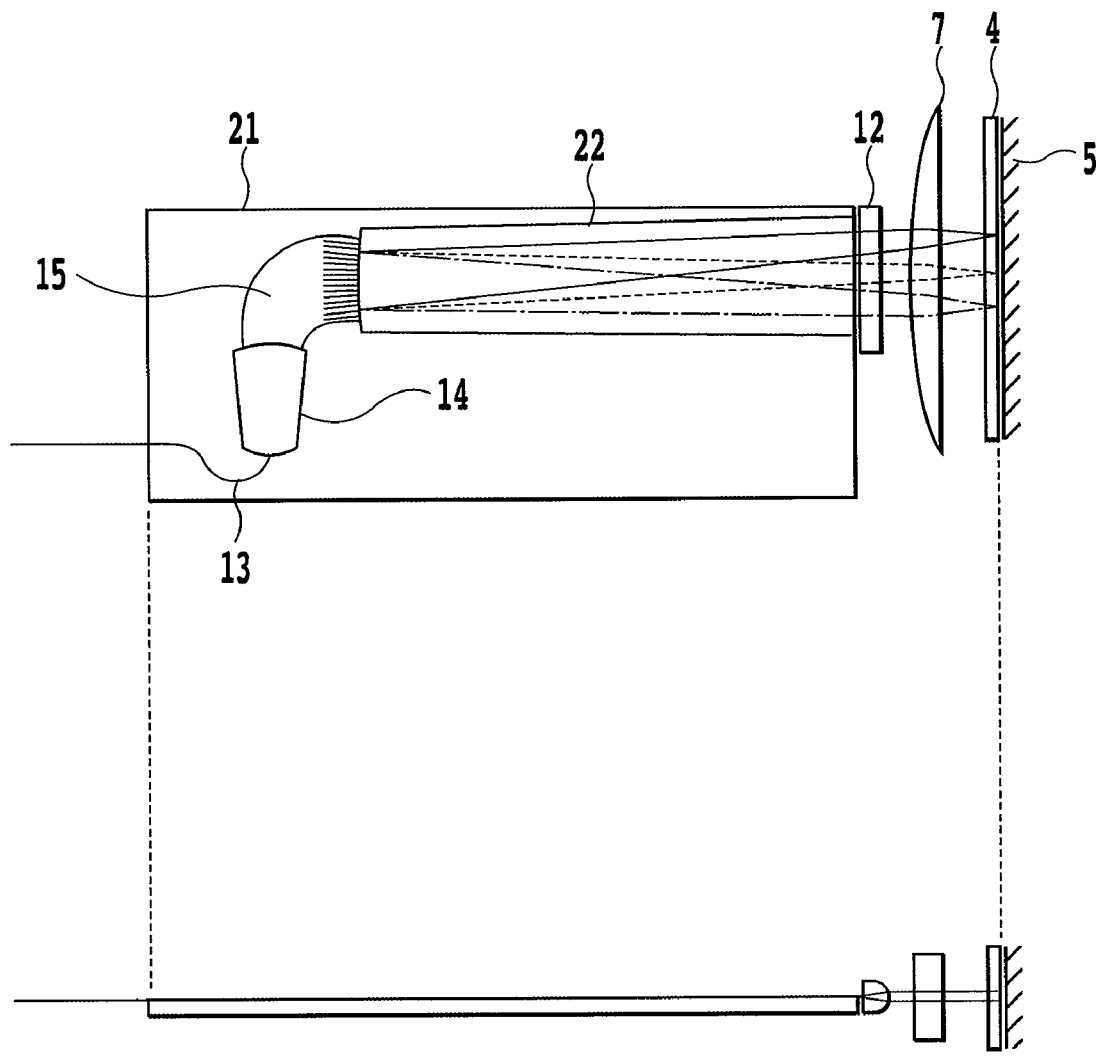
FIG. 5 illustrates the configuration of Illustrative Embodiment 3 of the optical signal processing device of the present invention using the AWG.

FIG. 5 illustrates a configuration of Illustrative Embodiment 3 of the optical signal processing device of the present invention using the AWG. Illustrative Embodiment 3 is characterized in that a part of the free space optical system in Illustrative Embodiment 2 is further incorporated in the AWG having a focusing power to thereby further reduce the length of the free space optical system. Specifically, the AWG 21 having a focusing power includes the input waveguide 13, the slab waveguide 14, and the arrayed-waveguide 15 having a focusing power and further includes an output slab waveguide 22. Based on the optical coupling conditions, the front focal point position of the x-cylindrical lens 7 must optically correspond to the dispersion center of the AWG 21 (i.e., a position at the boundary between the arrayed-waveguide 15 and the slab waveguide 22). The expression "optically correspond" means that an optical reduced length obtained by dividing an real path distance by the refractive index of the medium is used to make the total optical reduced length from the dispersion center to the x-cylindrical lens 7 correspond to the front focal length of the x-cylindrical lens 7.

When compared with the configuration of Illustrative Embodiment 2 shown in FIG. 4A, the output slab waveguide 22 can be used to reduce the distance from the output facet 9 of the AWG 21 to the x-cylindrical lens 7. By reducing the length itself of the free space optical system, the expansion of the optical signal in the y axis direction as described in Illustrative Embodiment 2 can be suppressed, thus eliminating the need of the y-cylindrical lens 8 in FIG. 4A. Furthermore, the adjustment accuracy required to determine the position of the cylindrical lens 12 also can be reduced. By further reducing the distance of the free space optical system, the optical signal processing device can be mechanically strong and the optical characteristic such as the excessive loss can be more stable. Specifically, fluctuation of the excessive loss due to vibration or a temperature change can be more suppressed.

The following section will describe a specific configuration example where the optical signal processing device has an effective focal length of 30 mm. It is assumed that the x-cylindrical lens has the focal length f of 30 mm, the AWG lens has a focal length of 32.5 mm, the AWG's arrayed-waveguide has an outlet radius of 47 mm, and the distance between the x-cylindrical lens and the mirror is 0.5 mm. Here, the distance between the x-cylindrical lens and the AWG is adjusted so that the front focal point position of the x-cylindrical lens optically corresponds to the center of the boundary between the arrayed-waveguide 15 and the slab waveguide 22.

By the above-described configuration, in the entire communication C band, the excessive loss measured by the broadband light source and the optical spectrum analyzer was 1.0 dB or less. This loss is at the same level as that of the optical signal processing device of the conventional configuration. According to Illustrative Embodiment 3, the length of the free space optical system of optical signal processing device is reduced to a length equal to or shorter than a half of that provided by the conventional technique and the adjustment of optical signal processing device also can be simplified.

Illustrative Embodiment 4

Figure 6:
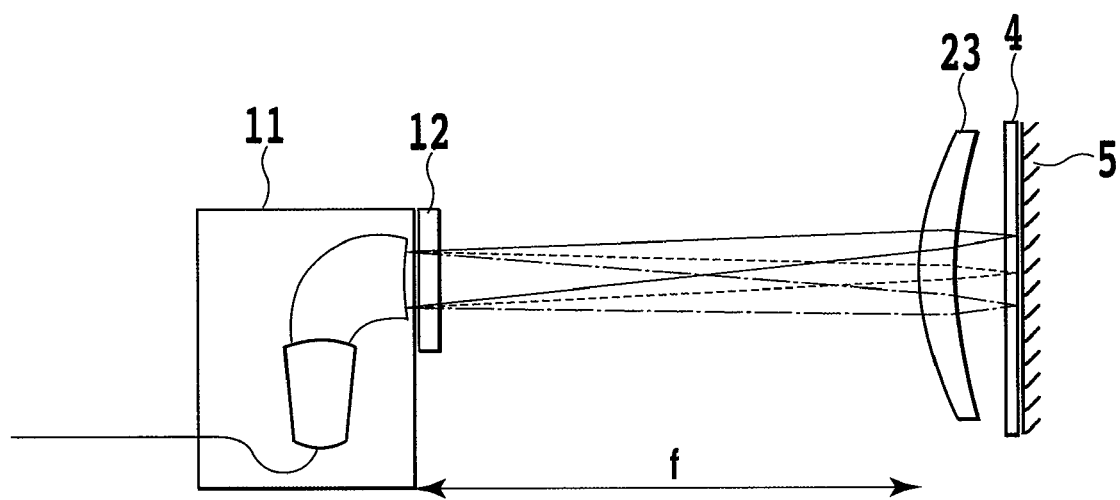
FIG. 6 illustrates the configuration of Illustrative Embodiment 4 of the optical signal processing device of the present invention using the AWG.

FIG. 6 illustrates the configuration of Illustrative Embodiment 4 of the optical signal processing device of the present invention using the AWG. In the optical signal processing device of the present invention, an optical signal emitted from the AWG having a focusing power has a circular arc-like focal point plane having the center at the center portion of the arrayed-waveguide emission plane. Specifically, the focal point plane has a large curved field. Thus, in order to correct the curve of this focal point plane to have a flat surface, the AWG-side preferably has a focusing lens having a convex structure.

As shown in FIG. 6, the optical signal processing device of Illustrative Embodiment 4 is characterized in that the focusing lens 2 in the configuration shown in FIG. 3A is substituted with a plano-convex lens or meniscus lens 23 in which the AWG-side has a convex shape. The field curvature caused by the AWG lens can be cancelled by the field curvature by the plano-convex lens or meniscus lens 23 to thereby suppress the field curvature of the entire optical signal processing device. The suppressed field curvature can suppress the light coupling loss of the optical signal that has wavelengths at both end regions of the communication band processed by the optical signal processing device and that is focused at the periphery of the signal processing device 4.

Figure 7:
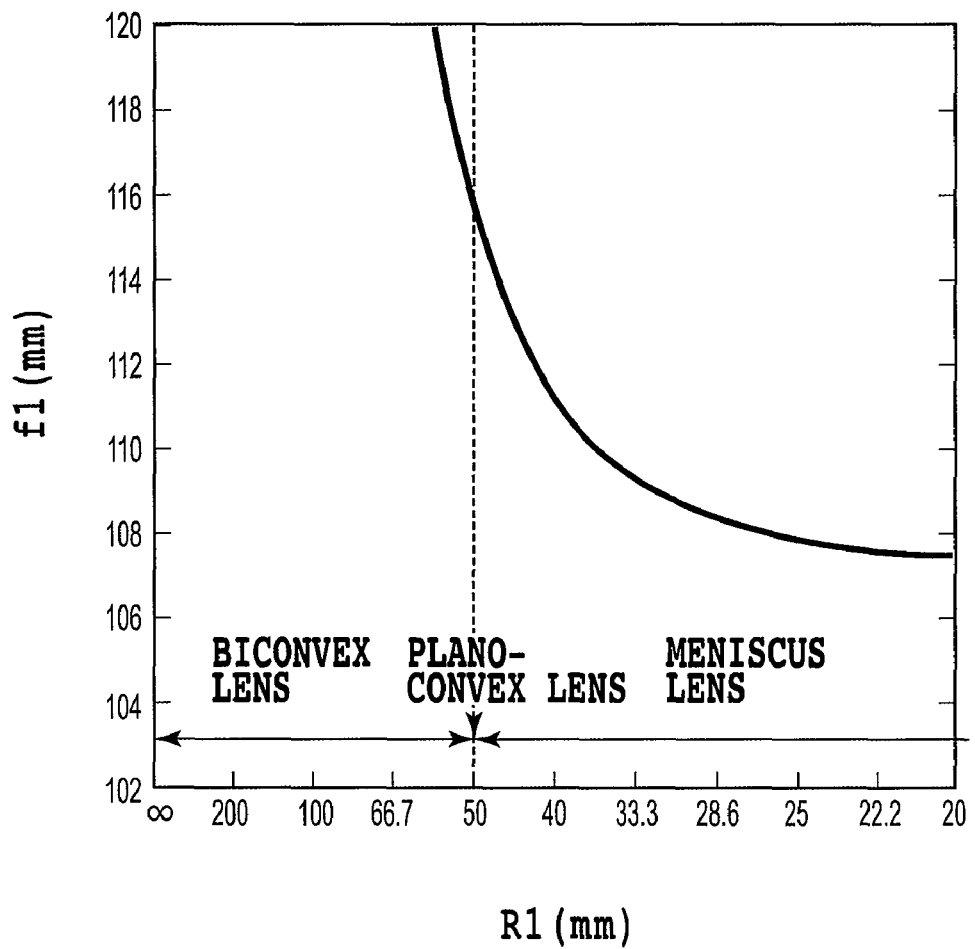
FIG. 7 is a graph illustrating the effect of a plano-convex lens or a meniscus lens in Illustrative Embodiment 4.

FIG. 7 is a graph showing an effect by the plano-convex lens or meniscus lens in Illustrative Embodiment 4 of reducing the optical path. In the graph shown in FIG. 7, the horizontal axis shows the radius R1 of the AWG side surface of the focusing lens 23 in the configuration shown in FIG. 6 and the vertical axis shows the focal length f1 by the focusing power owned by the AWG 11. Here, based on the assumption that the AWG 11 has a center wavelength of 1590 nm and the focusing lens 23 is made of BK7, the effective focal length determined by the AWG 11 and the focusing lens 23 was fixed to 100 mm and the field curvature was calculated by a ray trace calculation. The curve in the graph of FIG. 7 shows a relation f1 and R1 at which the field curvature of the focal plane at the mirror 5 is 0.

As is clear from FIG. 7, in the region of R1<50 mm (i.e., a region in which the focusing lens 23 has a biconvex lens shape), f1 increases rapidly. The rapid increase in f1 causes the total track of the free space optical system to be longer to thereby cause the entire device to have a larger size. Thus, in order to reduce the total track of the free space optical system, a region in which R1>50 mm is established (i.e., the focusing lens 23 preferably has a plano-convex or meniscus shape). When a meniscus-shaped x-cylindrical lens of R1=31 mm was used to prepare an optical signal processing device having a configuration as in Illustrative Embodiment 2, the excessive loss thereof was 0.5 dB or less in the entire wavelength range of the communication C band. This demonstrates that the light coupling loss of an optical signal of a peripheral wavelength focused at the periphery of the signal processing device 4 can be sufficiently reduced.

As described above, the optical signal processing device of the present invention includes the AWG having a focusing property and a focusing lens placed in the vicinity of the signal processing device. Thus, the effective focal length EFL determining the linear dispersion value of the optical signal processing device is represented by the following formula.

$$\frac{1}{EFL} = \frac{1}{f1} + \frac{1}{f2} - \frac{d}{f1 \times f2} \quad \text{Formula (2)}$$

In the formula (2), d represents the distance between the first focusing lens 2 and the second focusing lens 3 in the configuration of the present invention shown in the conceptual diagram of FIG. 1B. In another embodiment shown in FIG. 2 and the respective illustrative embodiments of Illustrative Embodiment 1 to Illustrative Embodiment 4, f1 represents the focal length of the spectroscopic element (AWG) having a focusing power and d represents the distance between the spectroscopic element and the focusing lens, respectively.

Figure 8:
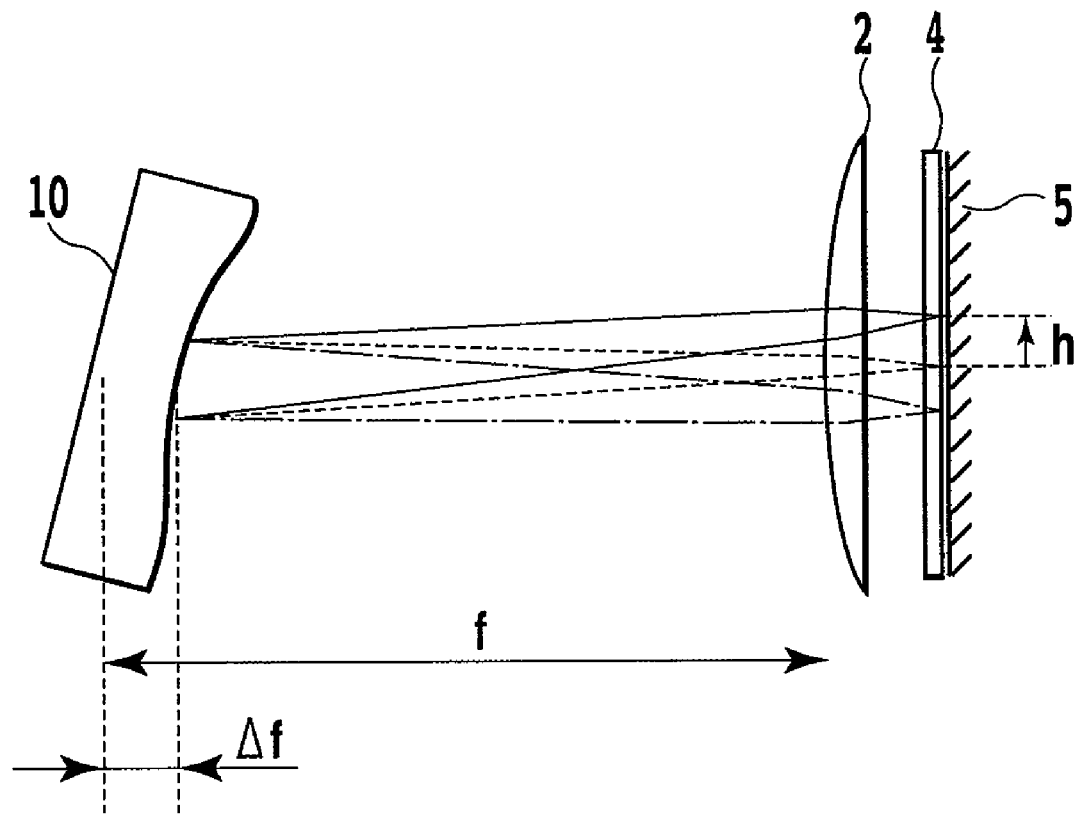
FIG. 8 illustrates a method of adjusting an effective focal length in the optical signal processing device of the present invention.

Even when the focal length of the focusing lens and the spectroscopic element include an error from the design value, the effective focal length of the optical signal processing device can be adjusted to have a predetermined target value by adjusting the distance d mechanically according to the formula (2). For example, as shown in FIG. 8, the position of the spectroscopic element 10 can be adjusted to be intentionally dislocated from the original focal length f of the focusing lens 2 by $\Delta f$ to thereby adapt the real linear dispersion value to the desired linear dispersion value.

For example, in the above-described optical system shown as Illustrative Embodiment 2 in which f1=100 mm and f2=104.6 mm are assumed, when f1 includes a focal length error of 1% of a lens according to a general manufacturing method, it is understood that EFL can be maintained to have a fixed value by merely using the formula (2) to adjust the value of the distance d by 0.05%. The value of the distance d is defined, as described above, based on the front focal length of the first focusing lens 2. However, the adjustment at this level merely causes an ignorable increase in the light coupling loss.

As described above in detail, according to the present invention, the length of the free space optical system of the optical signal processing device can be reduced to about a half of that provided by the conventional technique. Thus, the entire optical signal processing device can have a smaller size. Furthermore, the optical signal processing device can be subjected to an optical system adjustment easily. Furthermore, the light coupling loss having a wavelength dependency can be reduced significantly.

INDUSTRIAL APPLICABILITY

The present invention can be used for an optical signal processing device or the like in an optical communication network.

The invention claimed is:

1. An optical signal processing device, comprising:
   a dispersing means for spatially dispersing and outputting an optical signal from a dispersion center in a dispersion plane with an angle depending on a wavelength of the optical signal;
   a first focusing lens for focusing the optical signal dispersed by the dispersing means;
   a second focusing lens that is positioned in the vicinity of the dispersing means and between the first focusing lens and the dispersing means; and
   a signal processing means that is positioned at an opposite side of the dispersing means with respect to the first focusing lens, that is positioned at a position closer than a back focal point of the first focusing lens, and that subjects the optical signal focused by the first focusing lens and the second focusing lens to intensity modulation, phase modulation, or steering,
   wherein the dispersion center of the dispersing means is positioned in a front focal point position of a two-lens system comprising the first focusing lens and the second focusing lens or the vicinity thereof.

2. An optical signal processing device, comprising:
   a dispersing means for spatially dispersing and outputting an optical signal from a dispersion center in a dispersion plane with an angle depending on a wavelength of the optical signal;

a first focusing lens for focusing the optical signal dispersed by the dispersing means;

a second focusing lens that is positioned in the vicinity of the dispersing means and between the first focusing lens and the dispersing means; and a signal processing means that is positioned at an opposite side of the dispersing means with respect to the first focusing lens, that is positioned at a position closer than a back focal point of the first focusing lens, and that subjects the optical signal focused by the first focusing lens and the second focusing lens to intensity modulation, phase modulation, or steering, wherein a principal plane of the second focusing lens at the first focusing lens-side is positioned in a front focal point position of the first focusing lens or the vicinity thereof.

3. An optical signal processing device, comprising:

a dispersing means for dispersing and outputting an optical signal from a dispersion center in a dispersion plane with an angle depending on a wavelength of the optical signal;

a first focusing lens for focusing the optical signal dispersed by the dispersing means;

a second focusing lens that is positioned in the vicinity of the dispersing means and between the first focusing lens and the dispersing means; and a signal processing means that is positioned at an opposite side of the dispersing means with respect to the first focusing lens, that is positioned at a position closer than a back focal point of the first focusing lens, and that subjects the optical signal focused by the first focusing lens and the second focusing lens to intensity modulation, phase modulation, or steering, wherein the dispersion center of the dispersing means is positioned in a principal plane of the second focusing lens at the dispersing means-side and a principal plane of the second focusing lens at the first focusing lens-side is positioned in a front focal point position of the first focusing lens or the vicinity thereof.

4. An optical signal processing device, comprising:

a dispersing means for dispersing an optical signal from a dispersion center in a dispersion plane with an angle depending on a wavelength of the optical signal, the dispersing means has a focusing power in the dispersion plane, and an optical signal with a cylindrical wavefront is output from an optical signal output plane of the dispersing means, a focusing lens for focusing the optical signal dispersed by the dispersing means; and a signal processing means that is positioned at an opposite side of the dispersing means with respect to the focusing lens, that is positioned at a position closer than a back focal point of the first focusing lens, and that subjects the optical signal focused by the focusing lens to intensity modulation, phase modulation, or steering, wherein the dispersion center of the dispersing means is positioned in a front focal point position of the focusing lens or the vicinity thereof.

5. The optical signal processing device according to claim 4, wherein the focusing lens is a plano-convex lens or a meniscus lens of which convex-side faces the dispersing means.

6. The optical signal processing device according to claim 5, wherein the dispersing means is an arrayed-waveguide grating.

7. The optical signal processing device according to claim 6, further comprising a mirror that reflects the optical signal processed by the signal processing means to bend an optical path of the optical signal.

8. The optical signal processing device according to claim 6, wherein one or more output optical systems consisting of focusing lenses and dispersing elements is/are positioned at a position that is opposite side of an input optical system with respect to an axis of symmetry or at a position that is on an optical path extending from an axis of rotation, the axis of symmetry or the axis of rotation is located at the position of the signal processing means.

9. The optical signal processing device according to claim 4, further comprising:

a cylindrical lens that is positioned in the vicinity of the dispersing means and that has a focusing power in a direction vertical to the dispersion plane; and a second cylindrical lens that is positioned at a substantially intermediate point between the dispersing means and the signal processing device and that has a focusing power in a direction vertical to the dispersion plane, wherein the focusing lens is a cylindrical lens having a focusing power only in a direction including the dispersion plane.

10. The optical signal processing device according to claim 9, wherein the dispersing means is an arrayed-waveguide grating.

11. The optical signal processing device according to claim 10, further comprising a mirror that reflects the optical signal processed by the signal processing means to bend an optical path of the optical signal.

12. The optical signal processing device according to claim 10, wherein one or more output optical systems consisting of focusing lenses and dispersing elements is/are positioned at a position that is opposite side of an input optical system with respect to an axis of symmetry or at a position that is on an optical path extending from an axis of rotation, the axis of symmetry or the axis of rotation is located at the position of the signal processing means.

13. The optical signal processing device according to claim 4, wherein the dispersing means is an arrayed-waveguide grating.

14. The optical signal processing device according to claim 13, further comprising a mirror that reflects the optical signal processed by the signal processing means to bend an optical path of the optical signal.

15. The optical signal processing device according to claim 13, wherein one or more output optical systems consisting of focusing lenses and dispersing elements is/are positioned at a position that is opposite side of an input optical system with respect to an axis of symmetry or at a position that is on an optical path extending from an axis of rotation, the axis of symmetry or the axis of rotation is located at the position of the signal processing means.

16. An optical signal processing device comprising:

an arrayed-waveguide grating (AWG) comprising at least one input waveguide, a first slab waveguide, an arrayed-waveguide, and a second slab waveguide, the AWG spatially disperses an optical signal with an angle depending on a wavelength of the optical signal and the arrayed-waveguide has a focusing power in a dispersion plane and an optical signal having a cylindrical wavefront is emerged from an output facet of the AWG;

a first cylindrical lens for focusing the optical signal dispersed by the AWG;

a second cylindrical lens that is positioned in the vicinity of the output facet of the AWG and that has a focusing power in a direction vertical to the dispersion plane; and a signal processing means that is positioned at an opposite side of the AWG with respect to the first focusing lens, that is positioned at a position closer than a back focal point of the first focusing lens, and that subjects the optical signal focused by the first focusing lens to intensity modulation, phase modulation, or steering, wherein a front focal point position of the first cylindrical lens almost optically corresponds the output facet position of the array waveguide.

17. The optical signal processing device according to claim 16, further comprising a mirror that reflects the optical signal processed by the signal processing means to bend an optical path of the optical signal.

18. The optical signal processing device according to claim 16, wherein one or more output optical systems consisting of focusing lenses and dispersing elements is/are positioned at a position that is opposite side of an input optical system with respect to an axis of symmetry or at a position that is on an optical path extending from an axis of rotation, the axis of symmetry or the axis of rotation is located at the position of the signal processing means.

* * * * *